W. L. CLOUSE.
CRANK CONNECTION FOR HEADING SLIDES OF HEADING AND FORGING MACHINERY, PRESSES, NUT MACHINERY, AND THE LIKE.
APPLICATION FILED FEB. 18, 1920.
1,366,361.
Patented Jan. 25, 1921.
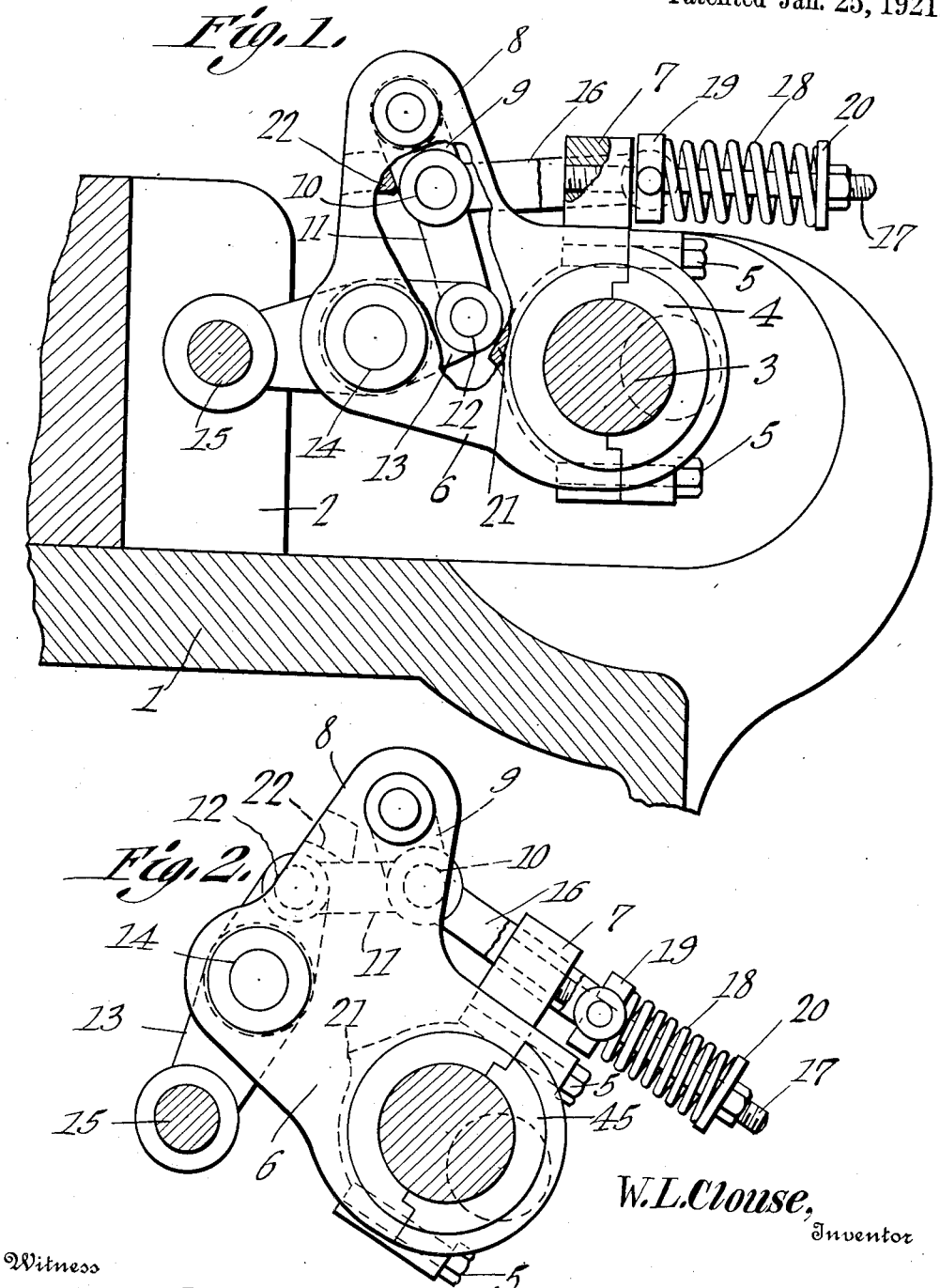

UNITED STATES PATENT OFFICE.

WILLIAM L. CLOUSE, OF TIFFIN, OHIO, ASSIGNOR TO THE NATIONAL MACHINERY CO., OF TIFFIN, OHIO.

CRANK CONNECTION FOR HEADING-SLIDES OF HEADING AND FORGING MACHINERY, PRESSES, NUT MACHINERY, AND THE LIKE.

1,366,361. Specification of Letters Patent. Patented Jan. 25, 1921.

Application filed February 18, 1920. Serial No. 359,596.

*To all whom it may concern:*

Be it known that I, WILLIAM L. CLOUSE, a citizen of the United States, residing at Tiffin, in the county of Seneca and State of Ohio, have invented a new and useful Crank Connection for Heading-Slides of Heading and Forging Machinery, Presses, Nut Machinery, and the like, of which the following is a specification.

This invention relates to a crank connection to be used with the heading slide of heading and forging machines, presses, nut machines and the like, the object of the invention being to provide a connection which will afford relief should the heading slide come against an unyielding obstruction, such relief preventing injury to the machine. The principal object of the invention, however, is to so construct the relief mechanism that it will only operate when the heading slide is subjected to extreme resistance sufficient to overcome a leverage and spring arrangement forming a part of the connection.

There are many reasons why some form of relief is advisable on a heading slide which the crank connection operates and several attempts have been made to develop some such relief device. In some of these forms the necessary relief is given in an emergency but it has been found that the relief devices very often operate unnecessarily, thus causing considerable annoyance and interfering with the proper operation of the machine. An object of the present invention is to so construct the relief device that it will not yield except when subjected to enormous pressure.

Another object is to provide a relief device which is simple and compact in construction and will not readily get out of order.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a vertical section through a portion of a heading slide and adjacent parts and showing the relief connection between the heading slide and the crank.

Fig. 2 is a view showing the relief connection shifted, as when the heading slide is subjected to excessive resistance.

Referring to the figures by characters of reference 1 designates the base of the machine on which is mounted the slide 2. 3 designates the operating crank. On this crank is mounted a split collar 4 fastened together in any desired manner, as by means of bolts 5 and carrying a bracket 6 and an upstanding ear 7. This bracket has an upstanding arm 8 thereon and pivotally connected to the upper end portion of this arm is one link 9 of a toggle. This link is pivotally connected, as at 10, to another toggle link 11 which is pivotally connected as at 12, to one arm of a lever 13. This lever is fulcrumed, as at 14, to the bracket 6 and has its other end pivotally connected, as at 15 to the heading slide 2. Links 16 are pivotally connected to the toggle at the point 10 and movably mounted relative to the ear 7. A rod 17 is fixedly connected to the ear 7 and has a spring 18 thereon which bears at its ends against collars 19 and 20. The collar 20 is adjustably secured to the stem 17 while the collar 19 is secured to the links 16. It is also capable of tilting relative to said rod, if necessary. Stop lugs 21 and 22 are provided where necessary on the bracket 6 and arm 8 for the purpose of limiting the movement of the toggle.

As shown in Fig. 1 the pivot 14 is slightly above and out of line with the longitudinal centers of the crank 3 and the pivot 15. It will also be noted that the pivot 10 is slightly out of line with the end pivots of the toggle links. When the parts are thus positioned the upper link of the toggle bears against the lug 22 while the end of the lever 13 bears against the lug 21. When the crank 3 rotates it transmits motion in the usual manner through the bracket 6 and lever 13 to the head 2. If, however, said head should be subjected to excessive resistance, the lever 13 would swing upwardly about its pivot 15, at the same time breaking the joints between the toggle links 9 and 11 so that the links 16 will press, through collar 19, against the spring 18. During this action the bracket 6 of course swings upwardly so as to allow the pivotal point 15 to move toward or relative to the crank 3, as shown in Fig. 2.

The structure described is advantageous because it will not operate unless the head 2 is subjected to enormous resistance.

What is claimed is:

1. The combination with a reciprocating member and a crank for actuating the same, of a bracket secured to and actuated by the crank, a lever fulcrumed between its ends upon the bracket and at one end to the reciprocating member, a toggle connected at one end to the bracket and at its other end to the other end of the lever, the intermediate joint of the toggle being out of line with the end pivoted toggle, and yielding means for exerting a constant pressure against the intermediate joint of the toggle to resist breaking of the joint, said means being yieldable under excessive pressure.

2. The combination with a reciprocating member and an operating crank, of a structure secured to and actuated by the crank, of a lever fulcrumed between its ends upon said structure and pivotally connected at one end to the reciprocating member, a toggle pivotally connected at one end to the other end of the lever and at its other end to said structure, and yielding means for resisting the breaking of the intermediate joint of the toggle, said intermediate joint being out of line with the end pivot of the toggle, and the intermediate bearing of the lever being out of line with the point of connection between said lever and the reciprocating member and the center of the operating crank.

3. The combination with a reciprocating member and an operating crank, of a structure actuated by and mounted on the crank, a lever pivotally connected between its ends to said structure and at one end to the reciprocating member, a stop for the other end of the lever, a toggle pivotally connected at one end to said structure and at its other end to said end of the lever, adjustable yielding means for exerting a constant thrust against the rod to resist the breaking of the joint of the toggle and means for limiting the movement of the toggle in one direction under the action of the yielding means.

4. The combination with a reciprocating member and a crank, of a connection between said member and the crank consisting of pivotally connected portions slightly off center, a toggle slightly off center for holding said portions of the connection normally in a predetermined relation, and yielding means for resisting the breaking of the intermediate joint of the toggle.

In testimony that I claim the foregoing as my own, I have hereto affixed my signature in the presence of two witnesses.

WILLIAM L. CLOUSE.

Witnesses:
  WALTER N. CLOUSE,
  A. D. GERMAN.